United States Patent [19]

Reber et al.

[11] 3,866,158
[45] Feb. 11, 1975

[54] RESISTANCE THERMOMETER

[75] Inventors: Rudi Reber, Neuenhasslau; Robert Herzog, Grosswelzheim, both of Germany

[73] Assignee: Deutsche Gold- und Silber-Scheideanstalt vormals Roessler, Frankfurt, Germany

[22] Filed: Aug. 17, 1973

[21] Appl. No.: 389,159

[30] Foreign Application Priority Data

Aug. 18, 1972  Germany.............................. 2240651

[52] U.S. Cl................................... 338/25, 338/311
[51] Int. Cl............................................. H01c 7/04
[58] Field of Search ........... 338/13, 22, 24, 306, 25, 338/252, 26, 28, 305, 229, 311, 210–212; 73/343 R, 343 B, 343 F, 350, 342, 351, 362 R, 362 AR; 29/610, 612–613; 310/68 C; 317/9 R

[56] References Cited
UNITED STATES PATENTS

| | | | |
|---|---|---|---|
| 2,798,377 | 7/1957 | Brownlee et al...................... | 73/341 |
| 2,946,974 | 7/1960 | Sias................................... | 73/342 X |
| 3,019,404 | 1/1962 | Fastenau et al...................... | 338/28 |
| 3,052,123 | 9/1962 | Gustafson ......................... | 73/343 R |

*Primary Examiner*—C. L. Albritton
*Attorney, Agent, or Firm*—Cushman, Darby & Cushman

[57] ABSTRACT

A resistance thermometer, especially suitable for measuring temperature in electrical machinery comprises a measuring wire located in a groove which is found on the narrow side of a thin flexible carrier body.

9 Claims, 3 Drawing Figures

RESISTANCE THERMOMETER

The invention is directed to a resistance thermometer especially suitable for measuring temperature in electrical machinery in which the measuring wire lies in a groove which is located on the narrow side of a thin, flexible carrier.

In order to protect electrical machinery against thermal overloading of high tension winding there must be carried out rapidly responding temperature measurements. There have been approved for this purpose resistance thermometers which are located in the grooves of these machines. These resistance thermometers must be thin and flexible so that they can be easily introduced into the grooves. Besides they must have a high pressure resistance since they are mostly pressed on the measuring place for better heat transfer.

It is known to use for such temperature measurements resistance thermometers in which the measuring wire, preferably of platinum or nickel, is wound around a thin carrier and is covered by two plates so that there is attained both an adequate electrical insulation and a sealing of the measuring wire against injurious outside influences. However, this arrangement has the disadvantage that a change in resistance of the measuring wire is herewith caused by the shrinking and stretching processes in this type of composition as well as by the pressing on in putting the cover plates on the carrier body which makes it impossible to keep a constant resistance value and therewith an exact measurement.

It is also known according to German Gebrauchsmuster 1,690,229 to provide for the measuring wire in grooves which are cut into the carrier body and to so receive the measuring wire along its entire length that it does not project beyond the surface of the carrier body. Therefore, pressure can no longer be exerted on the measuring wire itself. However, these resistance thermometers have the disadvantage that they cannot be produced thin and narrow enough since the carrier body must still have a certain mechanical stability.

It has now been found that resistance thermometers which are especially suited for measuring temperature in electrical machinery can be constructed in an especially thin, flexible and pressure insensitive manner if the measuring wire or coil lies in a groove which is located on the narrow side of a thin, flexible carrier body.

The measuring wire, which is generally wound, can be fixed in this groove by an insulating sealing compound. However, it has proven especially favorable to overcoat the carrier body together with the measuring wire with an insulating shrinkable tube, for example, made of polyvinyl chloride, polytetrafluoroethylene or irradiated biaxially oriented polyethylene or other heat shrinkable polymer.

As materials for the carrier body there can be used any electrical insulating material, especially organic synthetic resins, as for example, polytetrafluoroethylene or silicone rubber. However, there is preferably used resin impregnated fabrics according to DIN (German industrial standards) 7,735, i.e., textiles impregnated with synthetic resin.

The production of the longitudinal slot on the narrow side of the carrier body can be accomplished very simply by cutting into the carrier or by using three different sized individual parts adhered together.

It is also favorable to separate a thin metal layer on the resistance thermometer which is coated with a thin, shrinkable tube, which metal layer contributes to the screening against undesired magnetic and electrical fields which could falsify an exact temperature measurement.

The invention will be understood best in connection with the drawings wherein like numerals indicate like parts.

Figure 1:
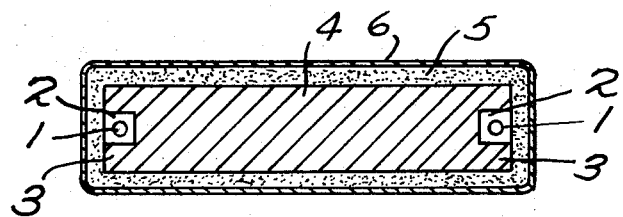
FIG. 1 is a schematic cross-sectional illustration of a resistance thermometer according to the invention.
Figure 2:
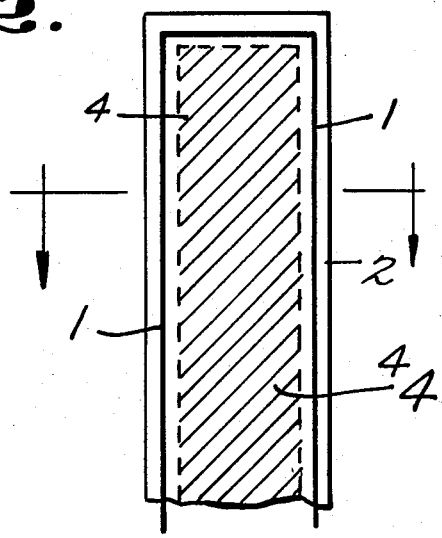
FIG. 2 is a longitudinally sectional view of such a thermometer.

Referring more specifically to FIGS. 1 and 2 of the drawings the measuring wire 1 lies in a groove 2 which is located in the narrow side 3 of a carrier body 4. The measuring wire can be fixed in the groove 2 with a sealing compound. The carrier body 4 together with the measuring wire, however, are preferably overcoated with a shrinkable tube 5, e.g., of polyvinyl chloride, which can have on its outer surface a thin metal layer 6, e.g., of copper.

Figure 3:
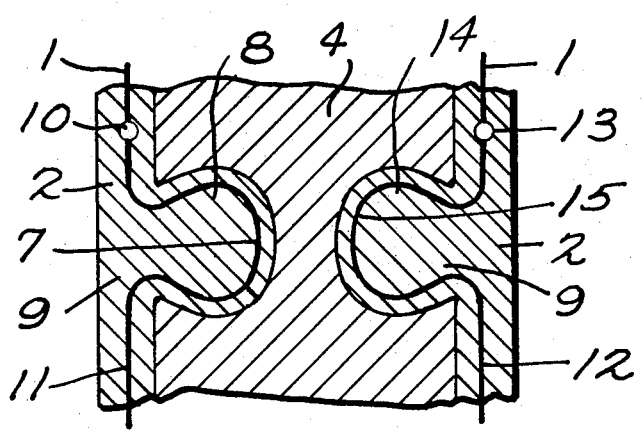
FIG. 3 is a fragmentary sectional view of the means for relieving tension in the measuring wire by way of the connecting wires.

The relief of tension of the measuring wire by way of the connecting wires is shown in FIG. 3. The connecting wires 11 and 12, which are joined to the measuring wire 1 at two connections 10 and 13 are led through in two loops 7 and 15 through two groove deepenings 8 and 14 perpendicular to groove 2 and produced by bores in the carrier body 4 and fixed by a suitable sealing compound 9, e.g., of epoxy resin or phenol-formaldehyde resin.

What is claimed is:

1. A resistance thermometer especially suitable for measuring temperature in electrical machinery comprising in combination a thin flexible carrier body having two opposed narrow sides and two opposed relatively wide sides and measuring wire means positioned in a first groove extending in and along the length of a narrow side of said thin flexible carrier body said wire means having a sensing portion for producing an electrical signal which varies as a function of temperature and lead portions for receiving an input signal and providing an output.

2. A resistance thermometer according to claim 1 wherein said carrier body is coated with material forming a thin shrinkable tube.

3. A resistance thermometer according to claim 2 wherein a thin metal overcoat is present on the outer surface of the tube.

4. A resistance thermometer according to claim 3, wherein the carrier body is made of a synthetic resin impregnated fabric.

5. A resistance thermometer according to claim 3, wherein the carrier body is made of a synthetic resin impregnated textile.

6. A resistance thermometer according to claim 1, wherein relief of tension of the measuring wire is provided by connecting wires which are joined to opposite ends of the measuring wire, said connecting wires passing as a pair of loops through groove deepenings in the carrier body perpendicular to said first groove, said loops being fixed in said groove deepenings with a sealing compound.

7. A resistance thermometer according to claim 6 wherein said carrier body is coated with material forming a thin shrinkable tube.

8. A resistance thermometer according to claim 7 wherein the thin shrinkable tube is provided with a thin metal external coating.

9. A resistance thermometer according to claim 8 wherein the carrier body is composed of a synthetic resin impregnated fabric.

* * * * *